US 6,482,247 B2

(12) United States Patent
Jaroszczyk et al.

(10) Patent No.: US 6,482,247 B2
(45) Date of Patent: Nov. 19, 2002

(54) MULTI-PANEL FLUID FILTER WITH EQUALIZED CONTAMINANT PASSAGES

(75) Inventors: Tadeusz Jaroszczyk, Stoughton, WI (US); Kent J. Kallsen, Oregon, WI (US); Jason E. Dorgan, Madison, WI (US); Jeffrey S. Morgan, Stoughton, WI (US); Stephen L. Fallon, Madison, WI (US); James A. Debilzen, Brooklyn, WI (US); Larry T. Gunderson, Madison, WI (US); Brad Henke, Madison, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/740,230

(22) Filed: Dec. 18, 2000

(65) Prior Publication Data

US 2002/0100263 A1 Aug. 1, 2002

Related U.S. Application Data

(63) Continuation-in-part of application No. 09/600,000, filed on Jun. 23, 2000, now Pat. No. 6,375,700.

(51) Int. Cl.⁷ .......................... B01D 46/12; B01D 50/00
(52) U.S. Cl. .............................. 55/484; 55/500; 55/502; 55/521
(58) Field of Search .......................... 55/482, 483, 484, 55/497, 500, 502, 521, DIG. 30; 210/493.1, 493.3, 323.1

(56) References Cited

U.S. PATENT DOCUMENTS

| 2,210,397 A | 8/1940 | Dreiss |
| 2,397,759 A | 4/1946 | Sigmund |
| 2,599,604 A | 6/1952 | Bauer et al. |
| 3,025,964 A | 3/1962 | Summers et al. |
| 3,112,184 A | 11/1963 | Hollenbach |
| 3,397,518 A | 8/1968 | Rogers |
| 3,432,357 A | * 3/1969 | Dankese ............ 55/521 |
| 3,487,625 A | * 1/1970 | Luas ............ 55/521 |
| 3,722,696 A | 3/1973 | Dwyer et al. |
| 3,739,916 A | 6/1973 | Cub et al. |
| 3,757,499 A | * 9/1973 | Scott ............ 55/521 |
| 3,871,851 A | 3/1975 | Neumann |
| 4,310,419 A | 1/1982 | Nara et al. |
| 4,419,108 A | 12/1983 | Frost et al. |
| 4,441,899 A | 4/1984 | Takagi et al. |
| 4,460,388 A | * 7/1984 | Fukami et al. ............ 55/521 |
| 4,589,983 A | 5/1986 | Wydevan |
| 4,652,286 A | 3/1987 | Kusuda et al. |
| 4,685,944 A | 8/1987 | Allan et al. |
| 4,728,349 A | * 3/1988 | Oshitari ............ 55/487 |

(List continued on next page.)

Primary Examiner—Duane Smith
Assistant Examiner—Jason M. Greene
(74) Attorney, Agent, or Firm—Andrus, Sceales, Starke & Sawall, LLP (57) ABSTRACT

A filter (200) filters fluid flowing along an axial flow direction (14) and includes a plurality of panels (206, 208, 240, 242) of pleated filter elements (44), each filter element having a plurality of pleats defined by wall segments (50) extending along a transverse direction (210) between first and second sets of pleat tips at first and second sets of axially extending bend lines (46, 48), the transverse direction (210) being perpendicular to the axial direction (14). Each of the panels (206, 208, 240, 242) extends along a lateral direction (212) perpendicular to the axial direction (14) and perpendicular to the transverse direction (210). The wall segments (50) extend axially between upstream and downstream ends (52, 54), and define axial flow channels (55) therebetween which are alternately sealed at the upstream and downstream ends. Transverse gaps (214, 236, 238, 244, 246, 248) are provided between panels and the housing at upstream and downstream ends (52, 54), providing additional fluid flow axially therethrough and equalized contaminant passages.

12 Claims, 13 Drawing Sheets

U.S. PATENT DOCUMENTS

| | | | |
|---|---|---|---|
| 4,738,778 A | * 4/1988 | Taki et al. | 55/521 |
| 4,746,339 A | * 5/1988 | Millard | 55/521 |
| 4,795,481 A | * 1/1989 | Ellis | 55/521 |
| 4,826,517 A | 5/1989 | Norman | |
| 4,885,015 A | 12/1989 | Goulet et al. | |
| 4,925,561 A | 5/1990 | Ishii et al. | |
| 4,929,263 A | 5/1990 | Kasugai | |
| 5,298,046 A | 3/1994 | Peisert | |
| 5,322,537 A | 6/1994 | Nakamura et al. | |
| 5,376,270 A | 12/1994 | Spearman | |
| 5,395,600 A | * 3/1995 | Cornelison | 55/497 |
| 5,494,497 A | 2/1996 | Lee | |
| 5,512,172 A | 4/1996 | Marble | |
| 5,525,136 A | 6/1996 | Rosen | |
| 5,562,825 A | 10/1996 | Yamada et al. | |
| 5,618,324 A | 4/1997 | Sommer et al. | |
| 5,620,505 A | 4/1997 | Koch et al. | |
| 5,674,302 A | 10/1997 | Nakayama et al. | |
| 5,679,122 A | 10/1997 | Moll et al. | |
| D396,098 S | 7/1998 | Gillingham et al. | |
| 5,779,747 A | 7/1998 | Schlor et al. | |
| 5,792,228 A | 8/1998 | Fath et al. | |
| 5,795,361 A | 8/1998 | Lanier, Jr. et al. | |
| D399,944 S | 10/1998 | Gillingham et al. | |
| 5,820,646 A | 10/1998 | Gillingham et al. | |
| 5,902,364 A | 5/1999 | Tokar et al. | |
| 5,958,097 A | 9/1999 | Schlor et al. | |
| 6,007,595 A | * 12/1999 | Baik et al. | 55/483 |
| 6,284,201 B1 | * 9/2001 | Buck | 55/521 |
| 6,375,700 B1 | * 4/2002 | Jaroszczyk et al. | 55/521 |

* cited by examiner

FIG. 1
PRIOR APPLICATION

FIG. 3
PRIOR APPLICATION

FIG. 4
PRIOR APPLICATION

FIG. 2
PRIOR APPLICATION

FIG. 5
PRIOR APPLICATION

FIG. 6
PRIOR APPLICATION

FIG. 7
PRIOR APPLICATION

FIG. 8
PRIOR APPLICATION

FIG. 9
PRIOR APPLICATION

FIG. 10
PRIOR APPLICATION

FIG. 11
PRIOR APPLICATION

FIG. 12
PRIOR APPLICATION

FIG. 13
PRIOR APPLICATION

MULTI-PANEL FLUID FILTER WITH EQUALIZED CONTAMINANT PASSAGES

CROSS REFERENCE TO RELATED APPLICATION

This application is a continuation-in-part of U.S. application Ser. No. 09/600,000 filed Jun. 23, 2000 now U.S. Pat. No. 6,375,700 B1, incorporated herein by reference.

BACKGROUND AND SUMMARY OF THE INVENTION

The invention relates to fluid filters, including panel-type air cleaners.

It is known in the prior art to use pleated filter blocks for various fluid filtering applications, including panel-type air cleaners. The parent invention and the present invention arose during continuing development efforts directed toward improving space efficiency, capacity, and performance, including reduced pressure drop, of classical panel air filters.

In the present invention, a multi-panel fluid filter with equalized contaminant passages is designed to maximize usage of the volume of the filter housing. The design produces a compact sized filtration system that can be designed with conventional panel filters. The new design makes it possible to either reduce the filter size for a stated fluid flow rate or increase the fluid flow rate for a filter with a size comparable to a conventional panel filter. The unit contaminant capacity for the new filter is greater since nearly the entire volume of the filter housing accommodates filter media.

Individual filter panels are made using alternating seal technology. A gap is provided between individual panels, and a series of spacers or holders are attached to individual panels, as independent inserts, or attached to the filter housing as covers, and uniformly space the pleated elements, including in the case of less rigid pleats. The individual pleated filter elements are sealed by means of an adhesive material and are merged with a leak free bond on one end and are open on the opposite end. The design prevents any contaminant from leaking without being filtered to the required level of particle size and concentration. The combined filter is sealed to the housing with a gasket permanently attached to the multi-element outer perimeter or permanently attached to the filter and the housing. The latter is a disposable filter design option. The gaps between the individual filter elements form flow passages that make it possible for contaminant particles to enter the pleated material through the filter front side between the alternately sealed pleats and through the space above or below the element. The filter front stays open to the flow, and the filter media surface is loaded uniformly with contaminant particles. Because of this uniformly distributed contaminant cake, the surface of the filter media is fully and optimally utilized to achieve high contaminant loading in a small volume.

It is known in the prior art to provide parallel flutes or individual layers of filter media to achieve high volume utilization of the filter housing. When the surface area of the media increases in such designs, the contaminant holding capacity also increases. However, the inlet of such filters can become clogged due to edge phenomena. For a fluid in motion, the flute edges are solid obstacles playing a similar role as single fibers due in filter media. Contaminant particles are captured by edges due to this inertial mechanism. Because adhesive forces between the collected particles are usually greater (because they are the same material) than those between the flute edge and the particles, additional particles are captured on previously captured contaminant, forming large clusters. These clusters can clog the flute openings and drastically increase filter pressure drop. Moreover, the particle aggregates formed on the edges of the flutes prevent the contaminants from entering the space downstream of the particle clusters.

In the present invention, contaminant accumulation on the inlet face is significantly reduced. In contrast to previous designs, the contaminant will not clog the filter inlet because there are allowable contaminant passages around the individual pleated layers of filter media. Contaminant holding capacity increases due to a more uniform flow field and maximum use of filter media surface. The contaminant cake is also distributed more uniformly along the entire filter element length. Because of the uniform contaminant mass distribution, filter pressure drop increases more slowly than previous designs, and filter life increases.

In the present invention, gaps in the multi-panel filter ensure more equalized flow and contaminant distribution to the filter media. The design enables the gaps to be large enough to resist plugging from occasional large objects such as feathers, grass clippings, seeds, insects, etc., that enter the air induction system in an air filter application. The incorporation of such gaps also reduces pressure drop.

BRIEF DESCRIPTION OF THE DRAWINGS

Parent Invention

FIGS. 1–15 are taken from parent U.S. application Ser. No. 09/600,000, filed Jun. 23, 2000.

Present Invention

DETAILED DESCRIPTION OF THE INVENTION

Parent Invention

The following description of FIGS. 1–15 is taken from parent U.S. application Ser. No. 09/600,000, filed Jun. 23, 2000.

Figure 1:
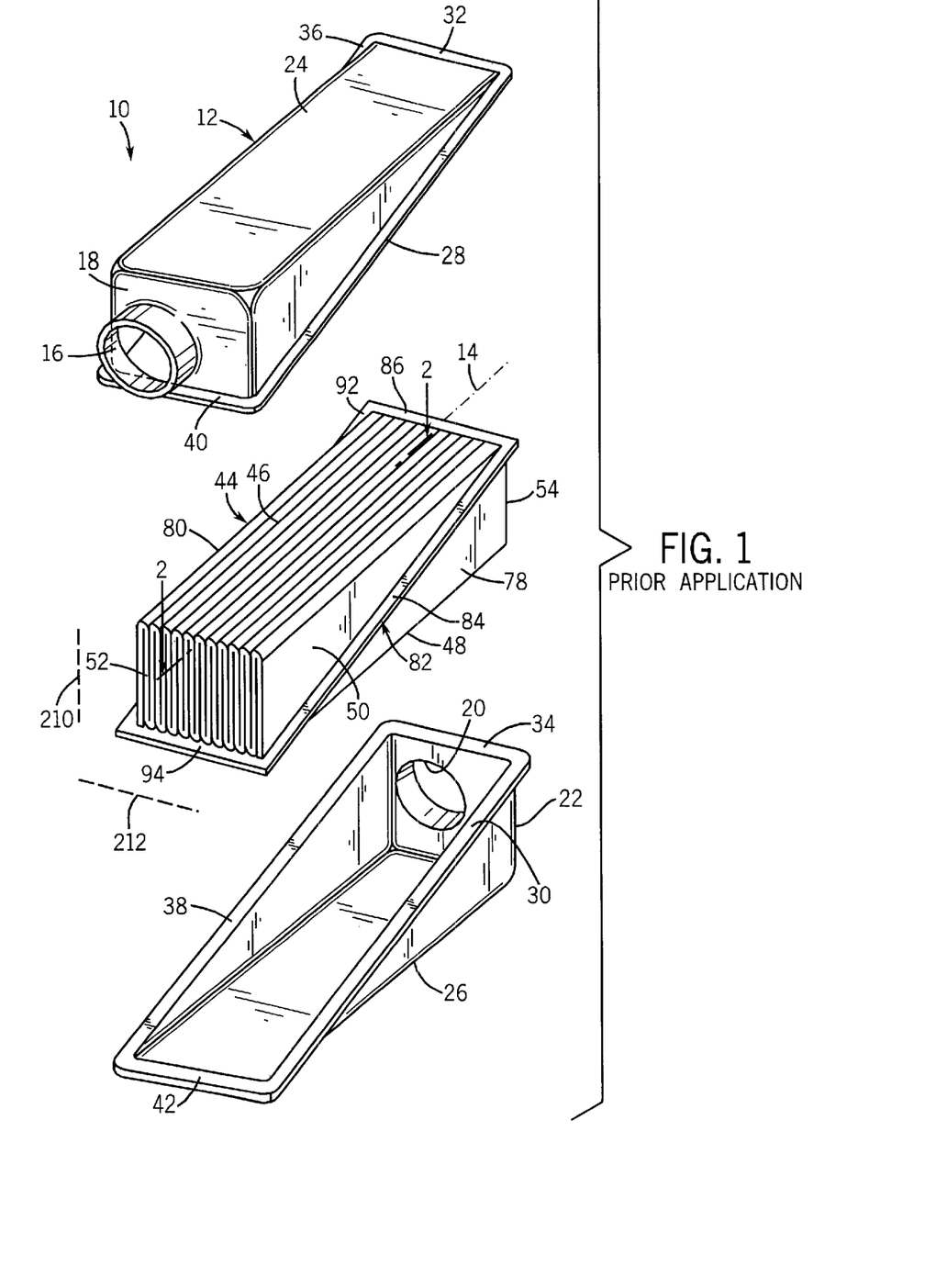
FIG. 1 is an exploded perspective view of a filter constructed in accordance with the parent invention.

FIG. 1 shows a filter 10 including a housing 12 extending axially along axis 14 and having an inlet 16 at one axial end 18 of the housing and having an outlet 20 at a distally opposite axial end 22 of the housing. The housing is preferably plastic and provided by identical upper and lower half sections 24 and 26 mating along diagonal flanges 28, 30, lateral flanges 32, 34, diagonal flanges 36, 38, and lateral flanges 40, 42.

A pleated filter block is provided by pleated filter element 44 in the housing. The pleated filter element is pleated along a plurality of upper bend lines 46 and lower bend lines 48, which bend lines extend axially. The filter element has a plurality of wall segments 50 extending in serpentine manner between the upper and lower bend lines. The wall segments extend axially between upstream ends 52 at inlet 16, and downstream ends 54 at outlet 20. The wall segments define axial flow channels 55 therebetween, FIG. 2. The upstream ends of the wall segments are alternately sealed to each other, as shown at 56 in FIG. 2, to define a first set of flow channels 58 having open upstream ends 60, and a second set of flow channels 62 interdigitated with the first set of flow channels 58 and having closed upstream ends 64. The downstream ends 54 of wall segments 50 are alternately sealed to each other, as shown at 66 in FIG. 2, such that the first set of flow channels 58 have closed downstream ends 68, and the second set of flow channels 62 have open downstream ends 70. Fluid to be filtered, such as air, flows substantially directly axially through filter element 44, namely from inlet 16 through open upstream ends 60 of the first set of flow channels 58 as shown at arrows 72, then through wall segments 50 as shown at arrows 74, then through open downstream ends 70 of the second set of flow channels 62 as shown at arrows 76, then to outlet 20. It is preferred that at least a portion of each of inlet 16 and outlet 20 are axially aligned.

Filter element 44 has laterally distally opposite right and left axially extending sides 78 and 80, FIG. 1, defining first and second axially extending planes. The second axial plane at side 80 is parallel to and spaced from the first axial plane at side 78. Upper bend lines 46 provide a first or upper set of coplanar bend lines defining a third axially extending plane. Lower bend lines 48 define a lower or second set of coplanar bend lines defining a fourth axially extending plane. The fourth axial plane at lower bend lines 48 is parallel to and spaced from the third axial plane at upper bend lines 46. The third and fourth axial planes are perpendicular to the noted first and second axial planes. Upstream ends 52 of wall segments 50 define a first laterally extending plane, and downstream ends 54 of the wall segments define a second laterally extending plane. The second lateral plane at downstream ends 54 is parallel to and spaced from the first lateral plane at upstream ends 52. The noted first and second lateral planes are perpendicular to the noted first and second axial planes and perpendicular to the noted third and fourth axial planes.

Figure 2:
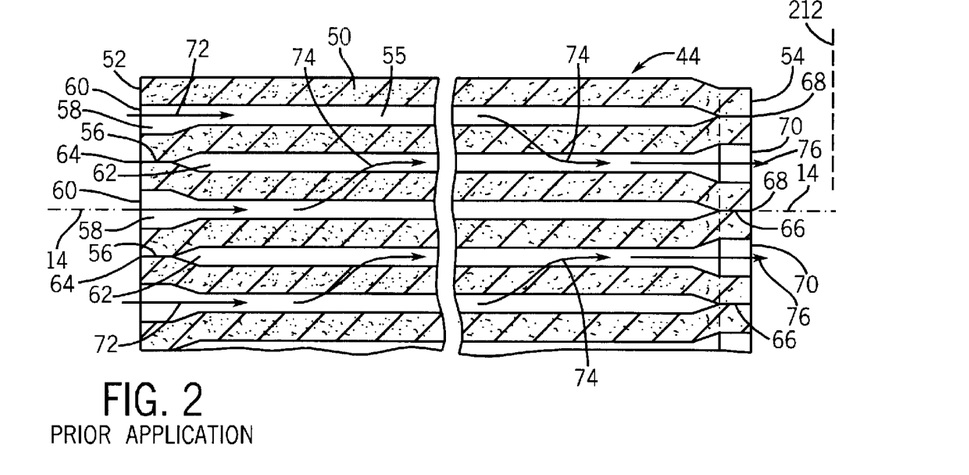
FIG. 2 is a sectional view taken along line 2—2 of FIG. 1.
Figure 3:
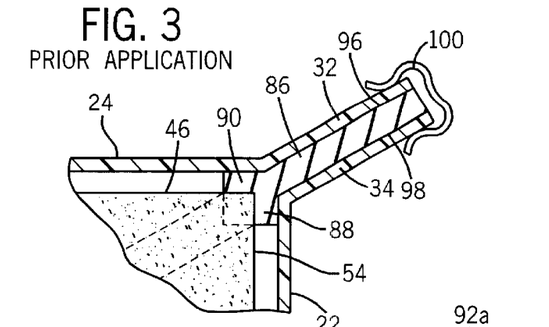
FIG. 3 is a sectional view of a portion of the filter of FIG. 1 in assembled condition.

A gasket 82, FIGS. 1, 3, is provided for sealing filter 44 to housing 12, such that air entering inlet 16 cannot bypass the filter element to outlet 20, and instead must flow through the filter element as shown at arrows 72, 74, 76, FIG. 2. Gasket 82 has a first section 84 extending along the noted first axial plane along right side 78. Gasket 82 has a second section 86 extending along the noted second lateral plane at downstream ends 54 as shown at 88 in FIG. 3, and also extending along the noted third axial plane at upper bend lines 46, as shown at 90 in FIG. 3. In alternate embodiments, second section 86 of gasket 82 extends along only one or the other of the noted second lateral plane at 88 or third axial plane at 90, but not both. Gasket 82 has a third section 92 extending along the noted second axial plane along left side 80. Gasket 82 has a fourth section 94 extending along the noted first lateral plane at upstream ends 52 of wall segments 50, and also extending along the noted fourth axial plane at lower bend lines 48, comparably to FIG. 3. In alternate embodiments, fourth section 94 of gasket 82 extends along only one or the other of the noted first lateral plane and fourth axial plane, but not both. Gasket 82 is preferably adhesively secured to filter element 44 along each of the noted gasket sections 84, 86, 92, 94, such that filter element 44 and gasket 82 are replaced as a modular unit. It is further preferred that the upper and lower surfaces of the gasket, such as 96 and 98, FIG. 3, be pinched and compressed between respective housing flanges such as 32 and 34, with such outer peripheral sandwich arrangement being held in assembled condition by any suitable means, such as clip 100, clamps, bolts, or the like. In alternate embodiments, other surfaces of the gasket may be used as the sealing surface against the housing. First and third gasket sections 84 and 92 extend obliquely relative to axis 14. Second and fourth gasket sections 86 and 94 extend perpendicularly to the noted first and second axial planes. Second and fourth gasket sections 86 and 94 are axially spaced, and first and third gasket sections 84 and 92 extend diagonally between second and fourth gasket sections 86 and 94.

Figure 4:
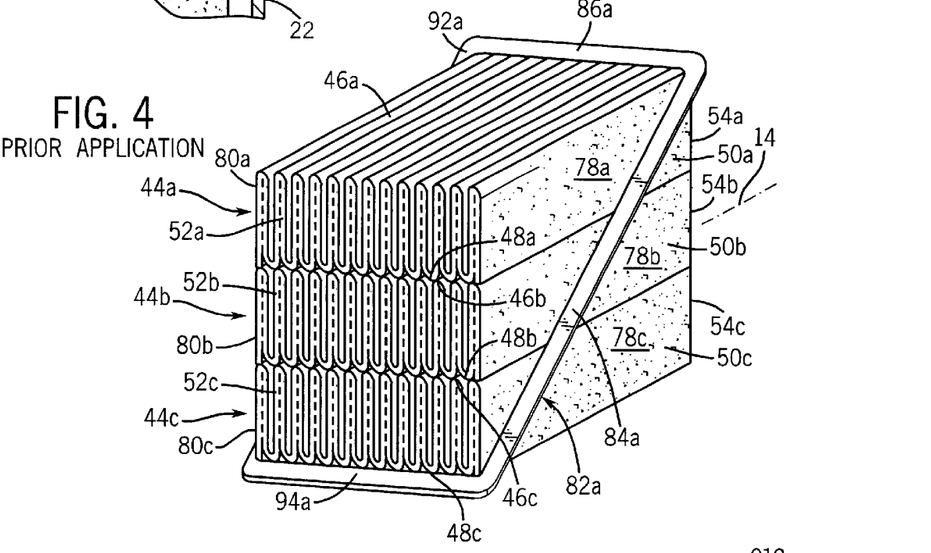
FIG. 4 is a perspective view similar to a portion of FIG. 1 and shows an alternate embodiment.

FIG. 4 shows a further embodiment having a plurality of filter elements 44a, 44b, 44c stacked on each other. The filter elements have respective wall segments 50a, 50b, 50c with upstream ends 52a, 52b, 52c and downstream ends 54a, 54b, 54c. Upstream ends 52a, 52b, 52c of the wall segments are coplanar along a first laterally extending plane. Downstream ends 54a, 54b, 54c are coplanar along a second laterally extending plane. The second lateral plane is parallel to and spaced from the first lateral plane. The filter elements have respective laterally distally opposite right and left sides 78a and 80a, 78b and 80b, 78c and 80c. Right sides 78a, 78b, 78c are coplanar along a first axially extending plane. Left sides 80a, 80b, 80c are coplanar along a second axially extending plane. The second axial plane is parallel to and spaced from the first axial plane. The filter elements 44a, 44b, 44c have respective upper sets of coplanar bend lines 46a, 46b, 46c, and lower sets of coplanar bend lines 48a, 48*b*, 48*c*. The upper set of coplanar bend lines 46*a* of top filter 44*a* defines a third axially extending plane. The lower set of coplanar bend lines 48*c* of the bottom filter element 44*c* defines a fourth axially extending plane. The fourth axial plane is parallel to and spaced from the third axial plane. The third and fourth axial planes are perpendicular to the first and second axial planes. The noted first and second lateral planes are perpendicular to the noted first and second axial planes and perpendicular to the noted third and fourth axial planes. Gasket 82*a* has a first section 84*a* extending along the noted first axial plane along right sides 78*a*, 78*b*, 78*c*. Gasket 82*a* has a second section 86*a* extending along the noted second lateral plane along downstream ends 54*a*, and also along the noted third axial plane along upper bend lines 46*a*. In alternate embodiments, gasket section 86*a* extends along only one or the other of the noted second lateral plane along downstream ends 54*a* or along the noted third axial plane along upper bend lines 46*a*, but not both. Gasket 82*a* has a third section 92*a* extending along the noted second axial plane along left sides 80*a*, 80*b*, 80*c*. Gasket 82*a* has a fourth section 94*a* extending along the noted first lateral plane along upstream ends 52*a*, 52*b*, 52*c*, and also extending along the noted fourth axial plane along lower bend lines 48*c*. In alternate embodiments, gasket section 94*a* extends along only one of the noted first lateral plane along upstream ends 52*a*, 52*b*, 52*c* or the noted fourth axial plane along lower bend lines 48*c*, but not both. The construction in FIG. 4 provides a pleated filter block having one or more rows of wall segments 50*a*, 50*b*, 50*c* folded in serpentine manner between respective bend lines, and providing filtered fluid flow substantially directly axially through the filter block along axis 14. First and third gasket sections 84*a* and 92*a* extend obliquely relative to axis 14. Second and fourth gasket sections 86*a* and 94*a* extend perpendicularly to the noted first and second axial planes. Second and fourth gasket sections 86*a* and 94*a* are axially spaced, and first and third gasket sections 84*a* and 92*a* extend diagonally between second and fourth gasket sections 86*a* and 94*a*.

Figure 5:
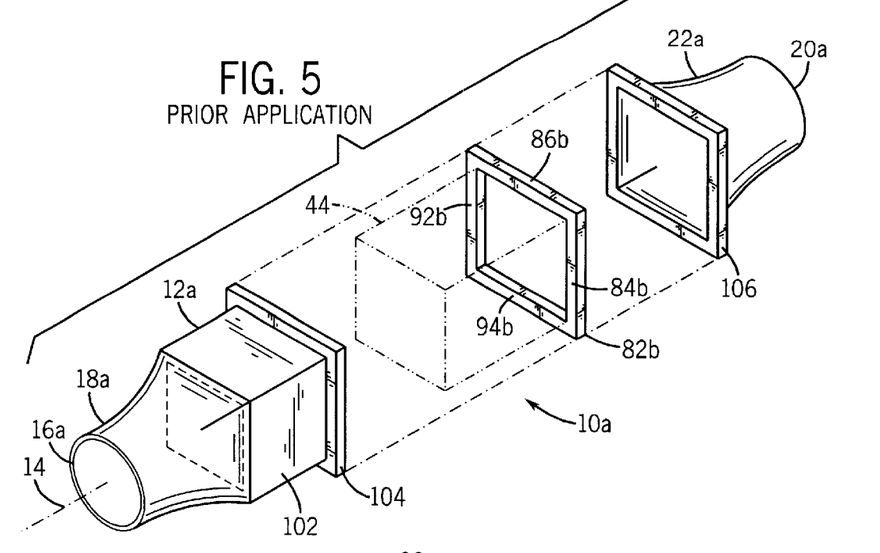
FIG. 5 is an exploded perspective view of an alternate embodiment.

FIG. 5 shows a further embodiment, and uses like reference numerals from above where appropriate to facilitate understanding. Filter 10*a* includes a housing 12*a* extending axially along axis 14 and having an inlet 16*a* at one axial end 18*a* of the housing and having an outlet 20*a* at a distally opposite axial end 22*a* of the housing. The housing is preferably plastic and provided by a box-like member 102 having an outer peripheral flange 104 mating with flange 106 of housing end 22*a* and pinching gasket 82*b* therebetween. Gasket 82*b* seals pleated filter block 44 or 44*a* in the housing. Unlike first and third sections 84 and 92 of gasket 82 in FIG. 1, first and third sections 84*b* and 92*b* of gasket 82*b* in FIG. 5 extend perpendicularly relative to the noted third and fourth axial planes. Like second and fourth sections 86 and 94 of gasket 82 in FIG. 1, second and fourth sections 86*b* and 94*b* of gasket 82*b* in FIG. 5 extend perpendicularly to the noted first and second axial planes. Gasket 82*b* has first section 84*b* extending along the noted first axial plane along right side 78 and also preferably extending along one of the noted lateral planes preferably the noted second lateral plane along downstream ends 54. Gasket 82*b* has second section 86*b* extending along the noted third axial plane along upper bend lines 46 and also along the noted one lateral plane preferably the lateral plane along downstream ends 54. Gasket 82*b* has third section 92*b* extending along the noted second axial plane along left side 80 and preferably along the noted one lateral plane preferably the lateral plane formed at downstream ends 54. Gasket 82*b* has fourth section 94*b* extending along the noted fourth axial plane along the noted lower bend lines 48 and also preferably along the noted one lateral plane preferably the lateral plane along downstream ends 54.

Figure 6:
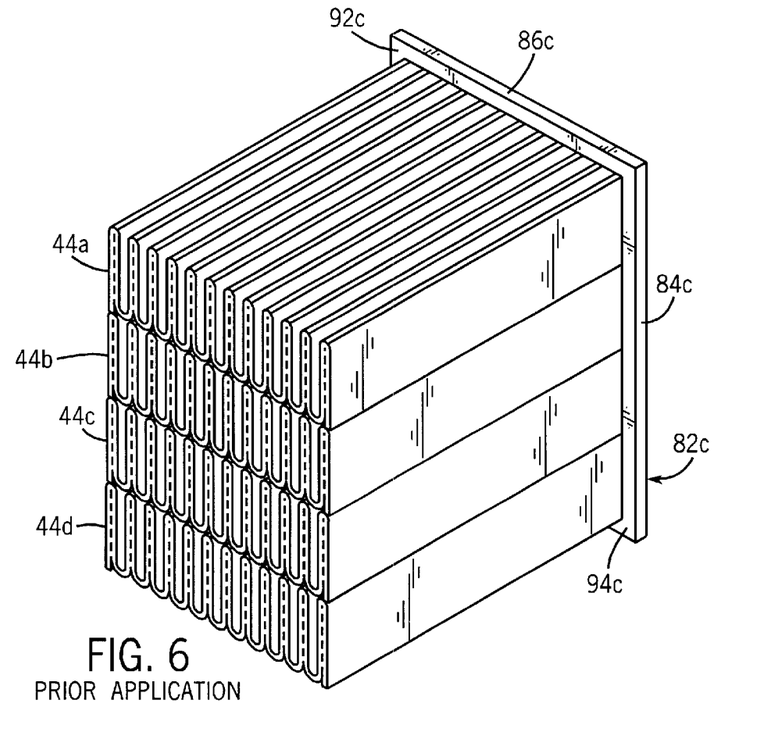
FIG. 6 is like FIG. 4 and shows another embodiment.

FIG. 6 shows a further embodiment and uses like reference numerals from above where appropriate to facilitate understanding. Filter elements 44*a*, 44*b*, 44*c*, 44*d* are stacked on each other. Gasket 82*c* corresponds to gasket 82*b* of FIG. 5 and includes corresponding gasket sections 84*c*, 86*c*, 92*c*, 94*c*.

Figures 7, 8:
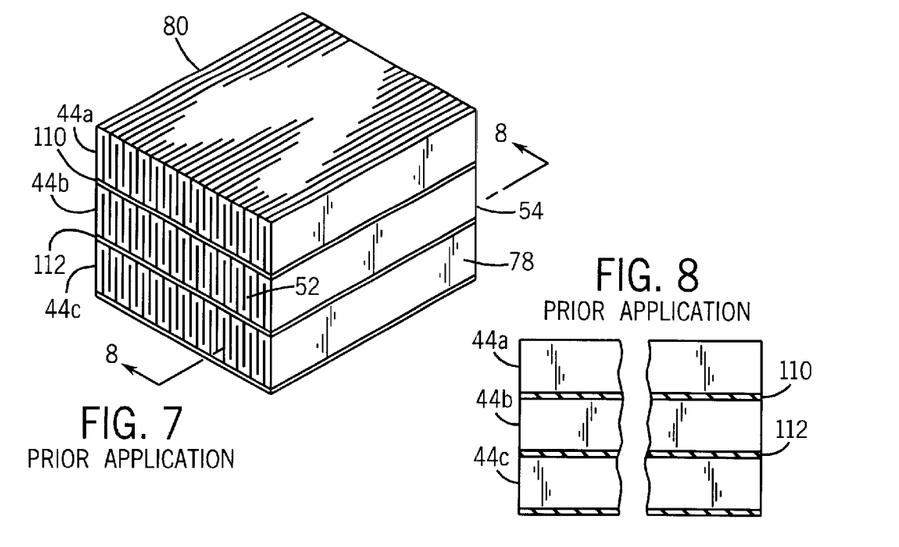
FIG. 7 is similar to FIG. 6 and illustrates sealing between elements.
FIG. 8 is a sectional view taken along line 8—8 of FIG. 7.

FIG. 7 is similar to FIG. 6 and uses like reference numerals from above where appropriate to facilitate understanding. Layers of sealing material 110, 112, etc. are between respective adjacent stacked filter elements, FIG. 8. In one embodiment, each layer 110, 112, etc. is impervious to the noted fluid to be filtered. In another embodiment, each layer 110, 112, etc. is pervious to such fluid and filters fluid flow therethrough. In the embodiment of FIGS. 7 and 8, each layer 110, 112, etc. spans the entire area between upstream ends 52 and downstream ends 54 and between right and left sides 78 and 80.

FIGS. 9–15 show another embodiment wherein the noted sealing layers of FIGS. 7 and 8 need not span the entire noted area between upstream and downstream ends 52 and 54 and right and left sides 78 and 80. In FIGS. 9–15, the noted sealing layers are provided by alternating strip layers such as 120, 122, 124, 126, 128, FIGS. 9, 10, including a first set of one or more upstream laterally extending strip layers 122, 126, etc., and a second set of one or more downstream laterally extending strip layers 120, 124, 128, etc., interdigitated with the first set of strip layers. Each strip layer 122, 126, etc. of the first set extends laterally between the right and left sides 78 and 80 at upstream end 52 and extends along the lower bend lines of the filter element thereabove and the upper bend lines of the filter element therebelow. Each strip layer 120, 124, 128, etc. of the second set extends laterally between right and left sides 78 and 80 at downstream end 54 and extends along the lower bend lines of the filter element thereabove and the upper bend lines of the filter element therebelow. A given filter element, e.g. 44*b*, has a strip layer 122 of the first set extending laterally along its upper bend lines at upstream end 52, and a strip layer 124 of the second set extending laterally along its lower bend lines at downstream end 54. Filter element 44*b* has no strip layer along its upper bend lines at downstream end 54, and has no strip layer along its lower bend lines at upstream end 52.

Figures 9, 10:
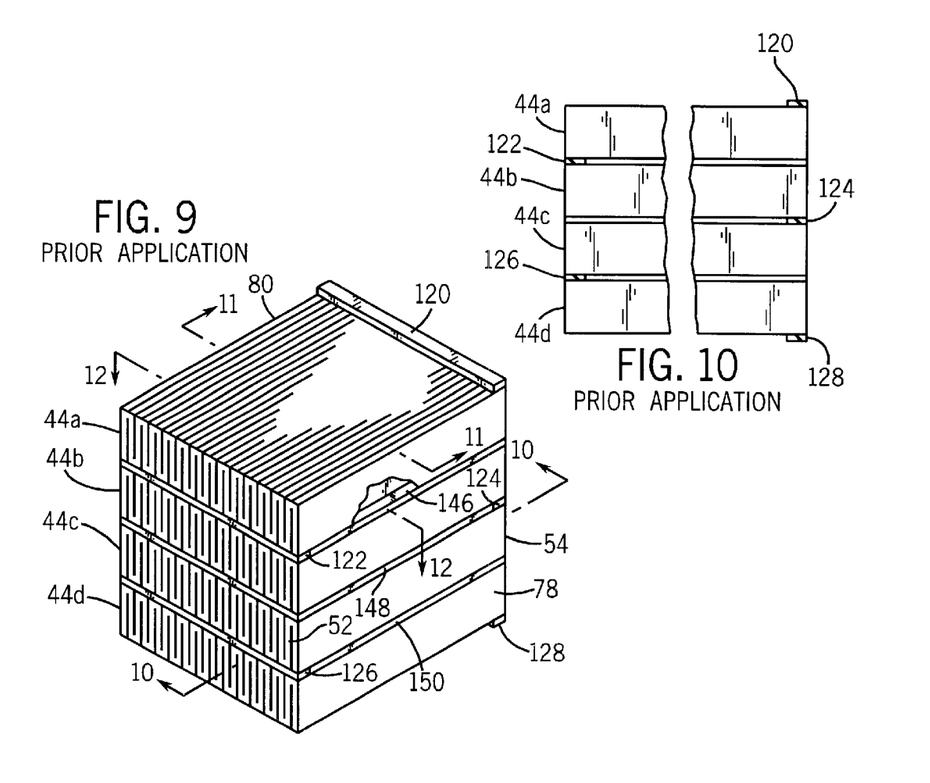
FIG. 9 is like FIG. 7 and shows another embodiment.
FIG. 10 is a sectional view taken along line 10—10 of FIG. 9.
Figure 11:
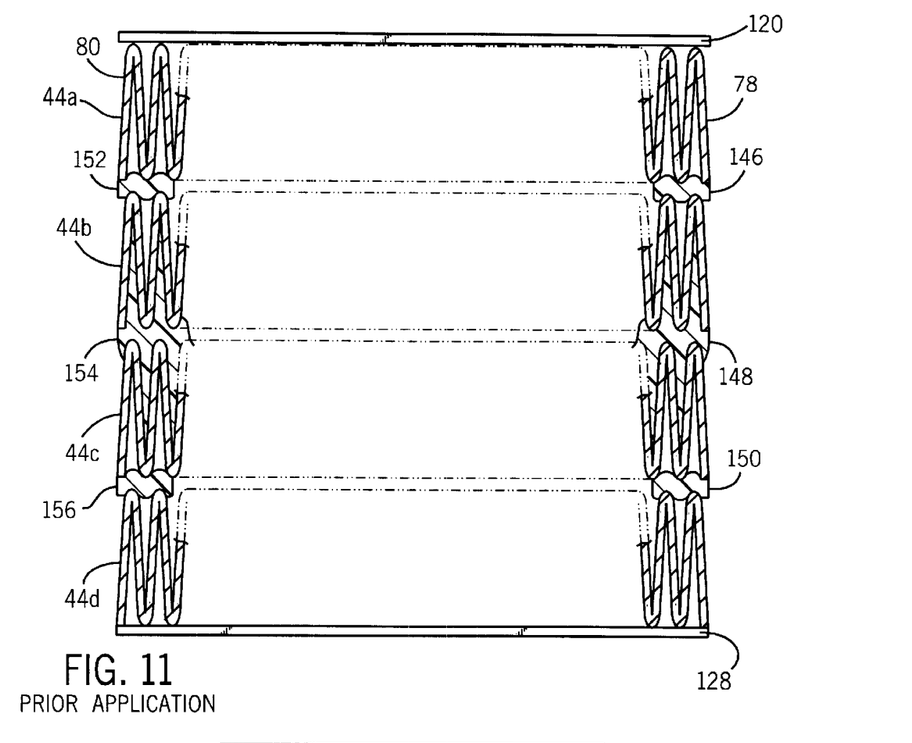
FIG. 11 is a sectional view taken along line 11—11 of FIG. 9.
Figure 12:
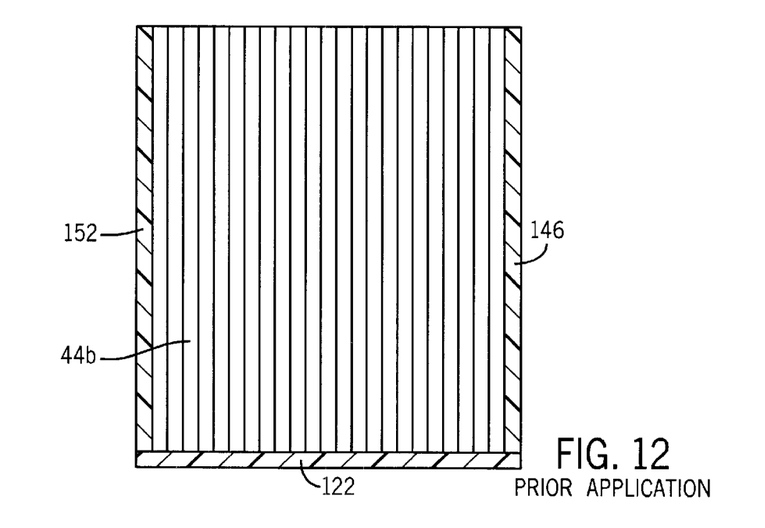
FIG. 12 is a sectional view taken along line 12—12 of FIG. 9.

A first filter element such as 44*a* has a first strip layer 122 of the first set extending along its lower bend lines at upstream end 52, a second filter element such as 44*b* has a first strip layer 124 of the second set extending laterally along its lower bend lines at downstream end 54, a third filter element such as 44*c* has a second strip layer 126 of the first set extending along its lower bend lines at upstream end 52. The noted first and second filter elements 44*a* and 44*b* have the first strip layer 122 of the first set extending laterally therebetween at upstream end 52. The noted first and second filter elements 44*a* and 44*b* have no strip layer extending laterally therebetween at downstream end 54. The noted second and third filter elements 44*b* and 44*c* have first strip layer 124 of the second set extending laterally therebetween at downstream end 54. The noted second and third filter elements 44*b* and 44*c* have no strip layer extending laterally therebetween at upstream end 52.

Figure 13:
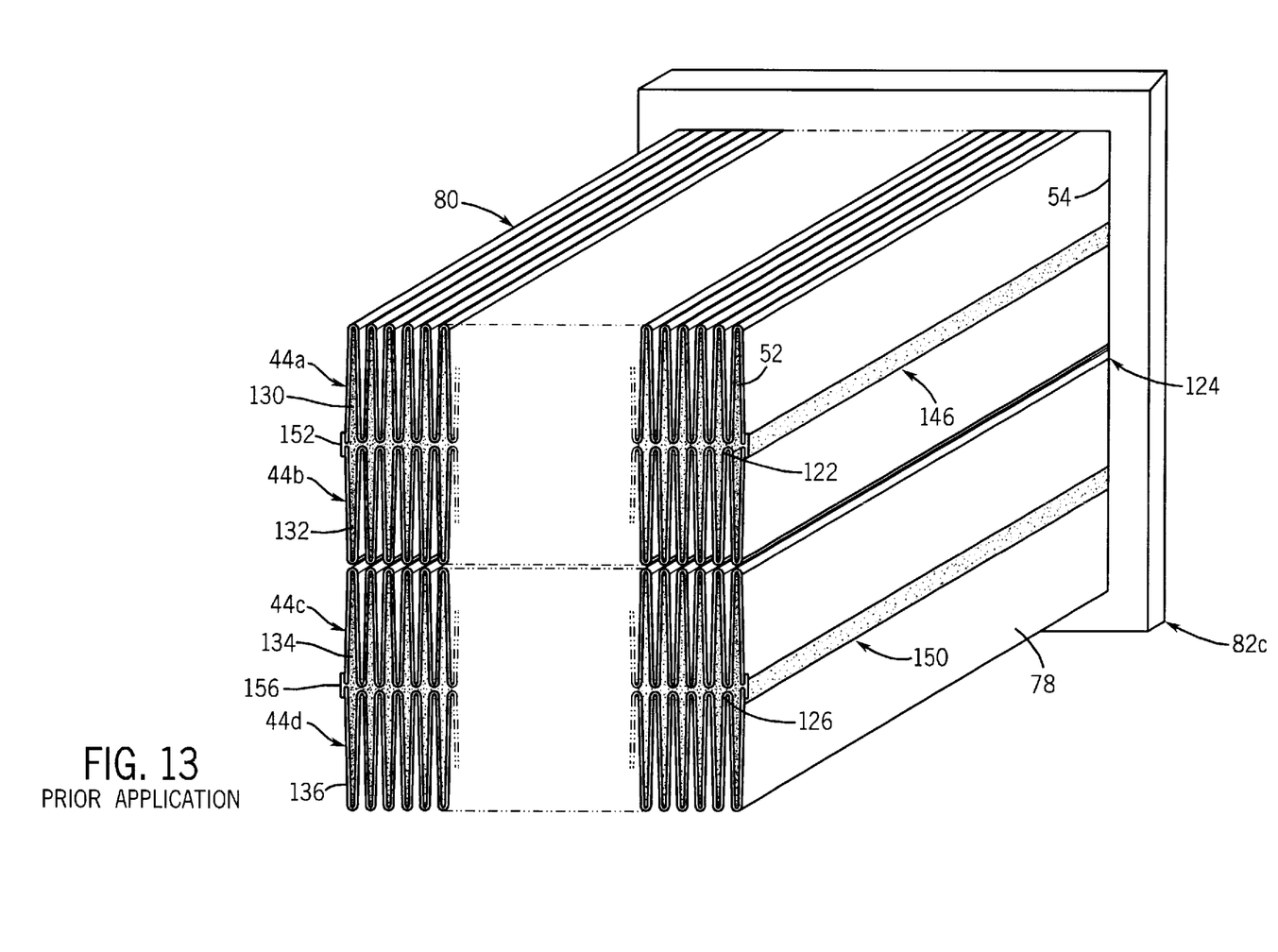
FIG. 13 is similar to FIGS. 4, 6, 7, 9, and further illustrates sealing.
Figure 14:
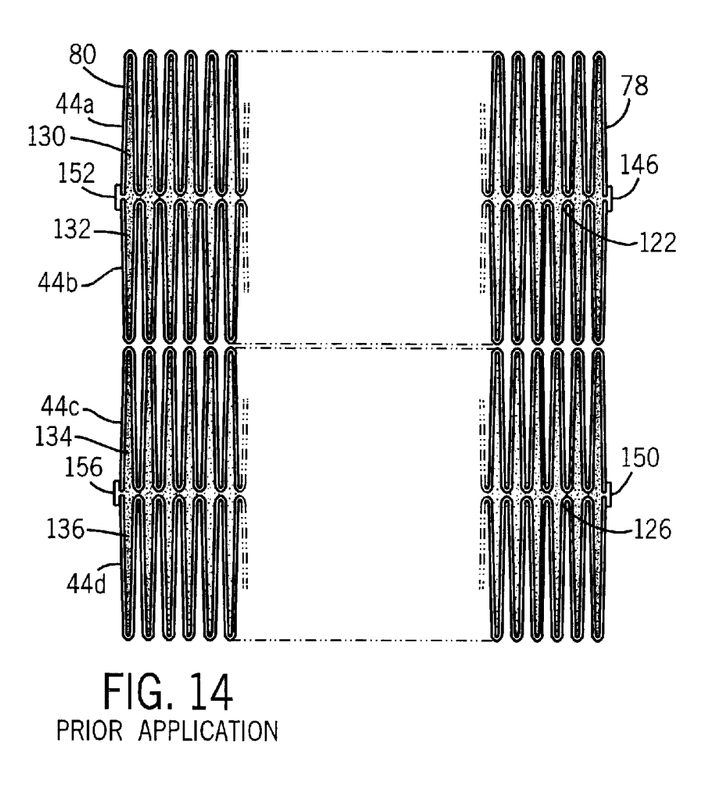
FIG. 14 is an elevational view of the front or upstream side of the filter of FIG. 13.
Figure 15:
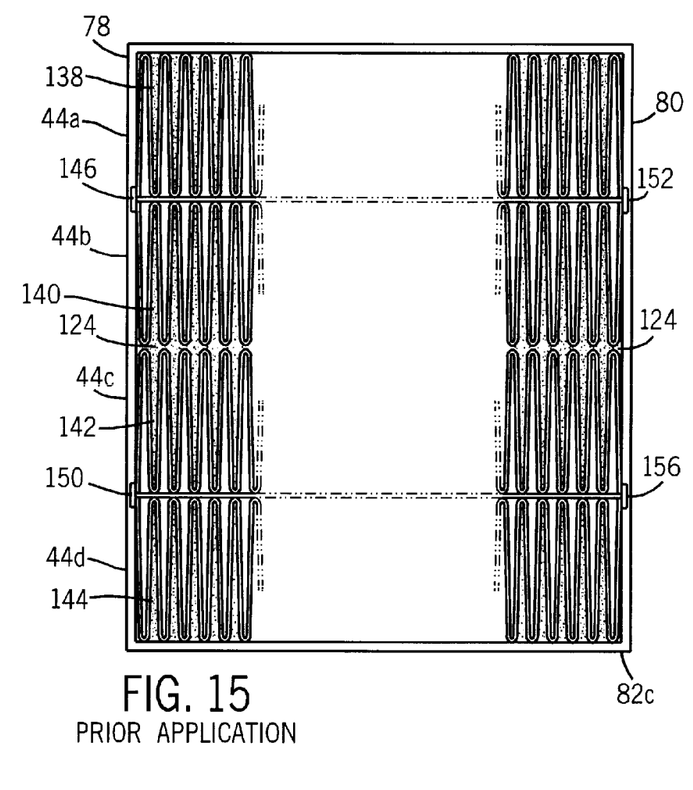
FIG. 15 is an elevational view of the back or downstream side of the filter of FIG. 13.

As shown in FIGS. 13 and 14, the closed upstream ends of the noted second set of flow channels are closed by sealing material such as 130 at filter element 44*a*, 132 at filter element 44b, 134 at filter element 44c, 136 at filter element 44d. The closed downstream ends of the first set of flow channels are closed by sealing material such as 138, FIG. 15, at filter element 44a, 140 at filter element 44b, 142 at filter element 44c, 144 at filter element 44d. Lateral sealing strip 122, FIGS. 13, 14, is sealed to the sealing material 130 in the closed upstream ends of the flow channels of filter element 44a thereabove and is sealed to sealing material 132 in the closed upstream ends of the flow channels of filter element 44b therebelow. Lateral strip 122 may be adhesively bonded to sealing material 130, 132, or may be integrally formed therewith as in a hot melt application, or the like. Lateral strip 126 is sealed to sealing material 134 in the closed upstream ends of the flow channels of filter element 44c thereabove and is sealed to the closed upstream ends of the flow channels of filter element 44d therebelow. Lateral sealing strip 124, FIG. 15, is sealed to sealing material 140 in the closed downstream ends of the flow channels of filter element 44b thereabove and is sealed to sealing material 142 in the closed downstream ends of the flow channels of filter element 44c therebelow. The described sealing protects the downstream, clean areas of the filter from the upstream, dirty areas of the filter.

In FIGS. 9—15, the noted sealing layers are also provided by a right set of axially extending side edge layers 146, 148, 150, etc., FIGS. 9, 11, 12, 13, 14, and a left set of axially extending side edge layers 152, 154, 156, etc. Each side edge layer of the right set extends axially from upstream end 52 to downstream end 54 and engages the right side of the filter element thereabove and the right side of the filter element therebelow such that the right side of the filter element is sealed to the right side of the filter element thereabove and to the right side of the filter element therebelow. Each side edge layer of the left set extends axially from upstream end 52 to downstream end 54 and engages the left side of the filter element thereabove and the left side of the filter element therebelow such that the left side of the filter element is sealed to the left side of the filter element thereabove and to the left side of the filter element therebelow. Side edge layers 148 and 154 are optional because of the sealing provided by downstream lateral sealing strip layer 124. FIGS. 13 and 14 show deletion of side edge layers 148 and 154. The noted lateral strip layers and side edge layers protect downstream and clean areas of the filter are from the upstream and dirty areas of the filter. The noted strip layers and edge layers are preferably provided by adhesive such as hot melt, though other types of sealing strips may be used.

Present Invention

FIGS. 16–23 illustrate the present invention and use like reference numerals from above where appropriate to facilitate understanding.

Figure 16:
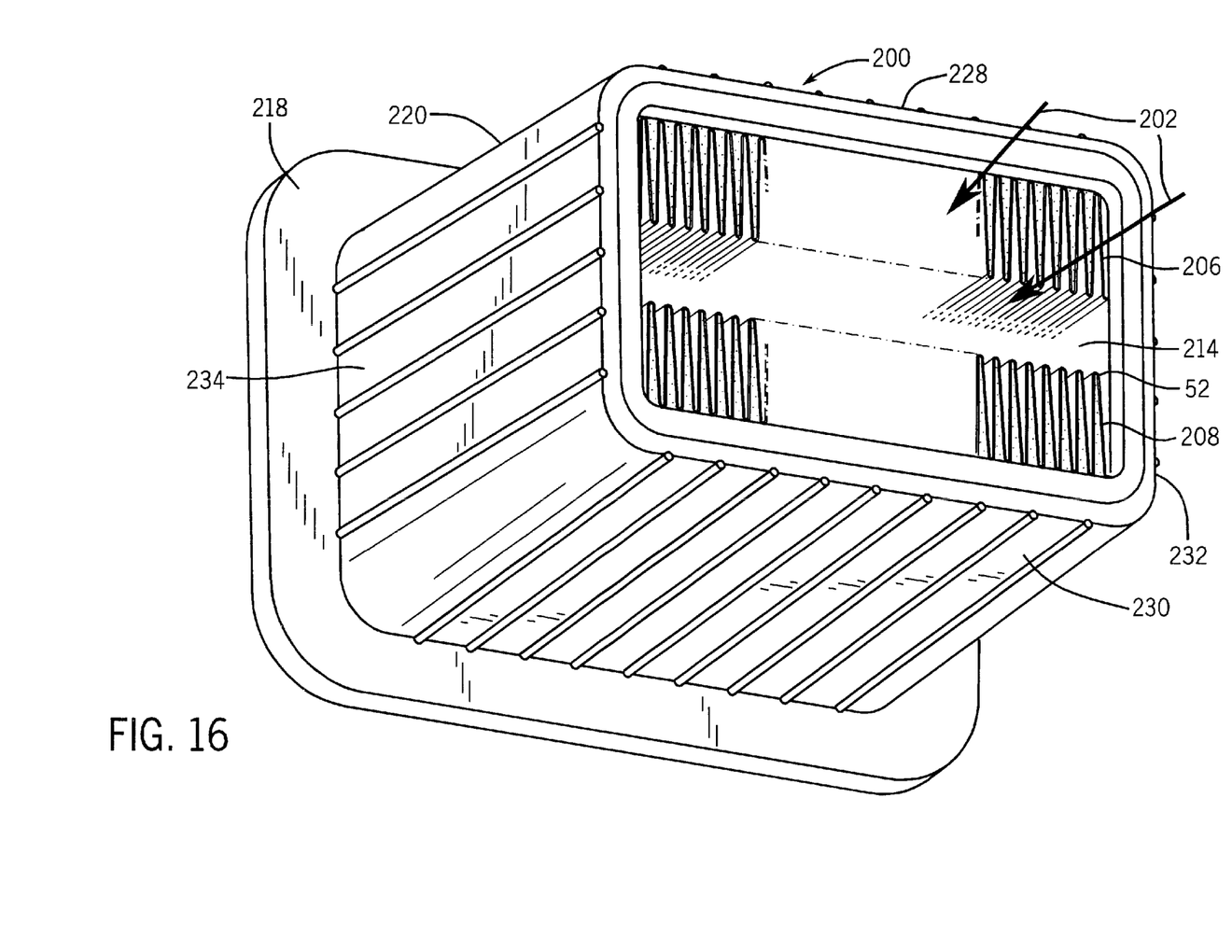
FIG. 16 is a perspective view showing the inlet end of a filter constructed in accordance with the present invention.
Figure 17:
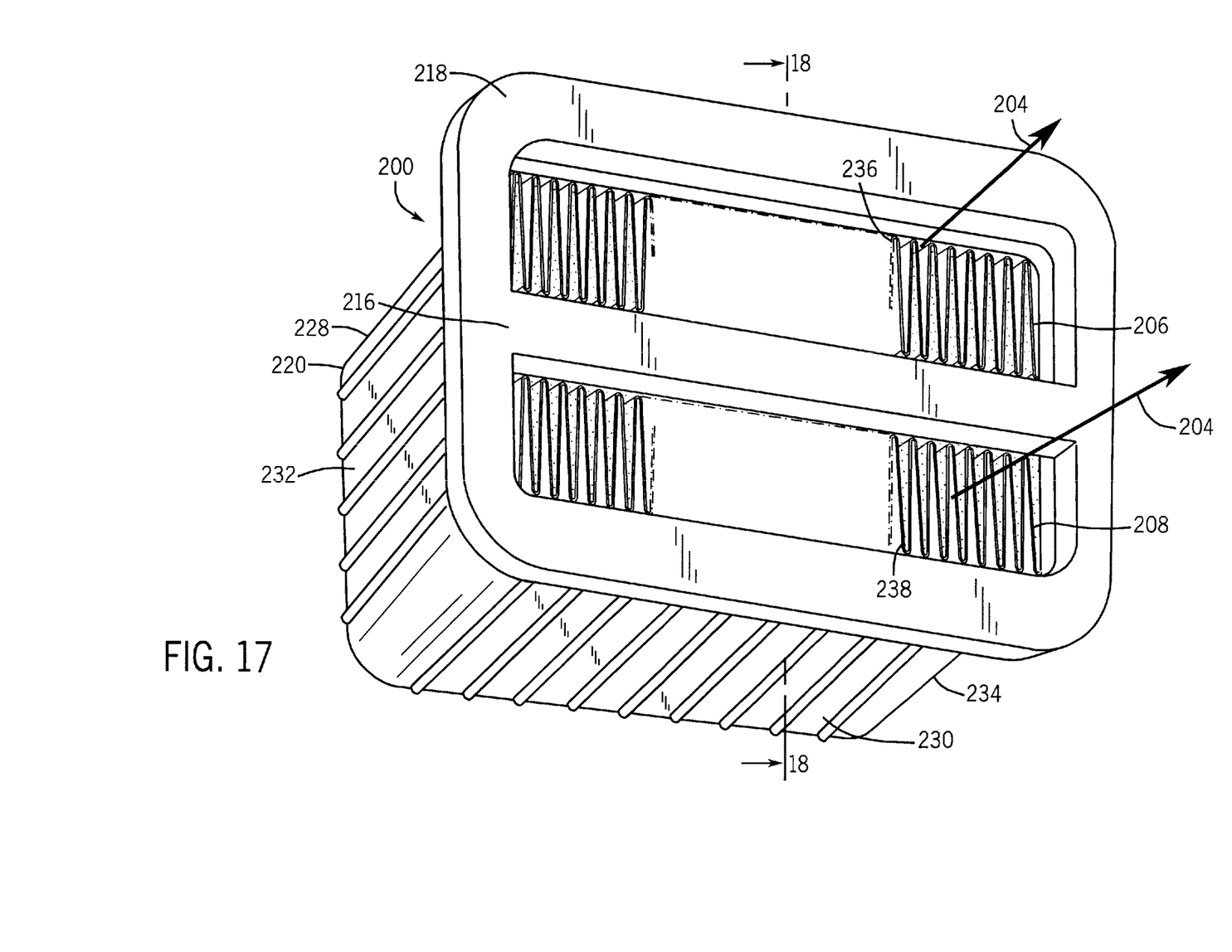
FIG. 17 is a perspective view showing the outlet end of the filter of FIG. 16.
Figure 18:
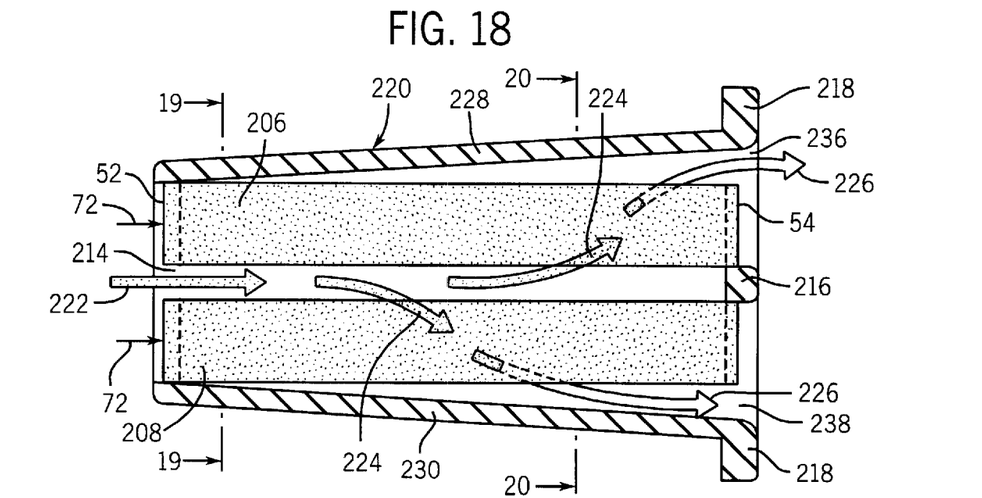
FIG. 18 is a sectional view taken along line 18—18 of FIG. 17.
Figure 19:
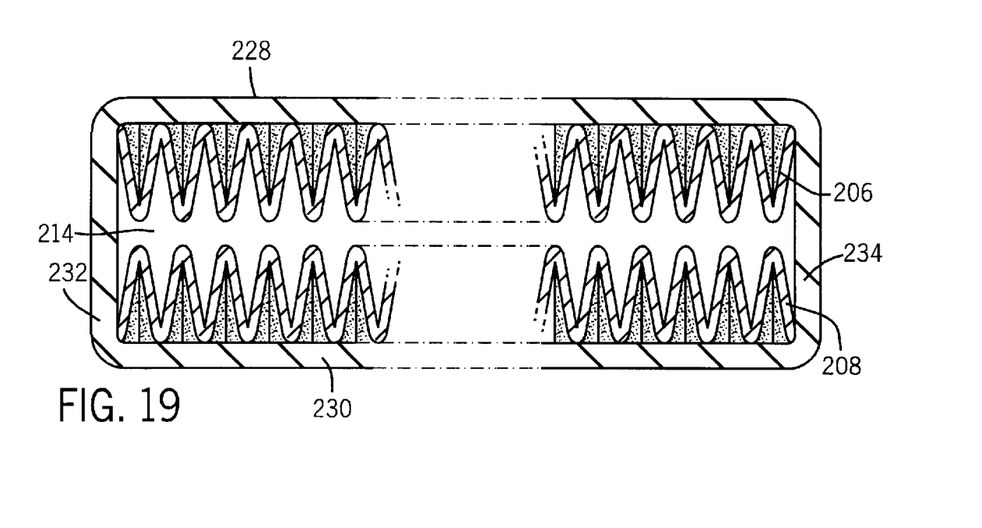
FIG. 19 is a sectional view taken along line 19—19 of FIG. 18.
Figure 20:
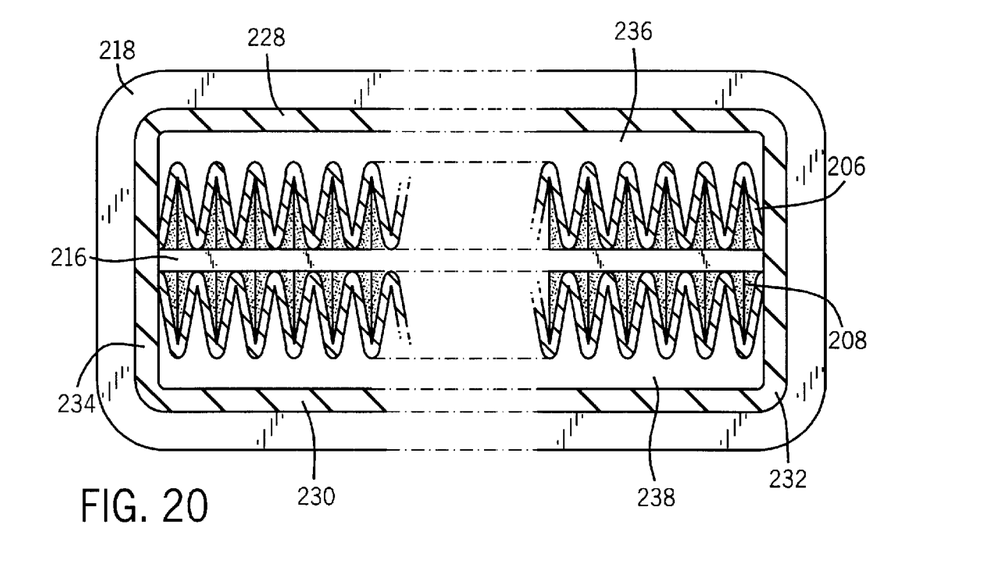
FIG. 20 is a sectional view taken along line 20—20 of FIG. 18.

FIGS. 16 and 17 show a filter 200 for filtering fluid flowing along an axial flow direction 14, FIGS. 1, 2, as shown at inlet flow arrows 202, FIG. 16 and outlet flow arrows 204, FIG. 17. The filter has a pair of panels or rows of pleated filter elements 206 and 208. Each filter element has a plurality of pleats defined by wall segments 50, FIGS. 1, 2, extending along a transverse direction 210 between first and second sets of pleat tips at first and second sets of axially extending bend lines 46 and 48. Transverse direction 210 is perpendicular to axial direction 14. Each of the panels 206 and 208 extends along a lateral direction 212 perpendicular to axial direction 14 and perpendicular to transverse direction 210. Wall segments 50 extend axially between upstream and downstream ends 52 and 54. The wall segments define axial flow channels 55 therebetween. The upstream ends of the wall segments are alternately sealed to each other, as shown at 56 in FIG. 2, to define a first set of flow channels 58 having open upstream ends 60, and a second set of flow channels 62 interdigitated with the first set of flow channels 58 and having closed upstream ends 64. The downstream ends 54 of wall segments 50 are alternately sealed to each other, as shown at 66 in FIG. 2, such that the first set of flow channels 58 have closed downstream ends 68, and the second set of flow channels 62 have open downstream ends 70. Fluid to be filtered, such as air, flows substantially directly axially through the filter element 44 of each of the panels 206, 208, through open upstream ends 60 of the first set of flow channels 58 as shown at arrows 72, FIG. 2, then through wall segments 50 as shown at arrows 74, then through open downstream ends 70 of the second set of flow channels 62 as shown at arrows 76.

Panels 206 and 208 have a transverse gap 214, FIG. 16, therebetween at upstream end 52, and are sealed to each other at downstream end 54 by sealing strip 216 which may be part of cover flange 218 at the downstream end of filter housing 220. Gap 214 provides additional fluid flow axially therethrough as shown at arrow 222, FIG. 18, i.e. fluid flows axially through the filter as described above and shown at arrows 72, 74, 76, FIG. 2, and additionally flows through the filter as shown at arrows 222, 224, 226, FIG. 18. Housing 220 includes laterally extending sidewalls 228 and 230 generally parallel to panels 206 and 208 and spaced transversally on distally opposite sides thereof. Housing 220 also includes sidewalls 232 and 234 extending transversely between lateral sidewalls 228 and 230. Sidewalls 228 and 230 are preferably slightly tapered outwardly away from each other from upstream end 52 to downstream end 54 and are sealed at their upstream ends to respective panels 206, 208, and have transverse gaps 236, 238 formed between sidewalls 228, 230 and respective panels 206, 208 at the downstream end providing the noted additional fluid flow 226 axially therethrough. In one embodiment, the filter panels are sealed to the housing by adhesive, and in another embodiment, the filter panels are sealed to the housing by a gasket as above described. In a further embodiment, the flow direction may be reversed such that incoming fluid flow enters the filter at end 54 through flow channels 70 and gaps 236, 238, and exits the filter at end 52 through flow channels 58 and gap 214.

Figure 21:
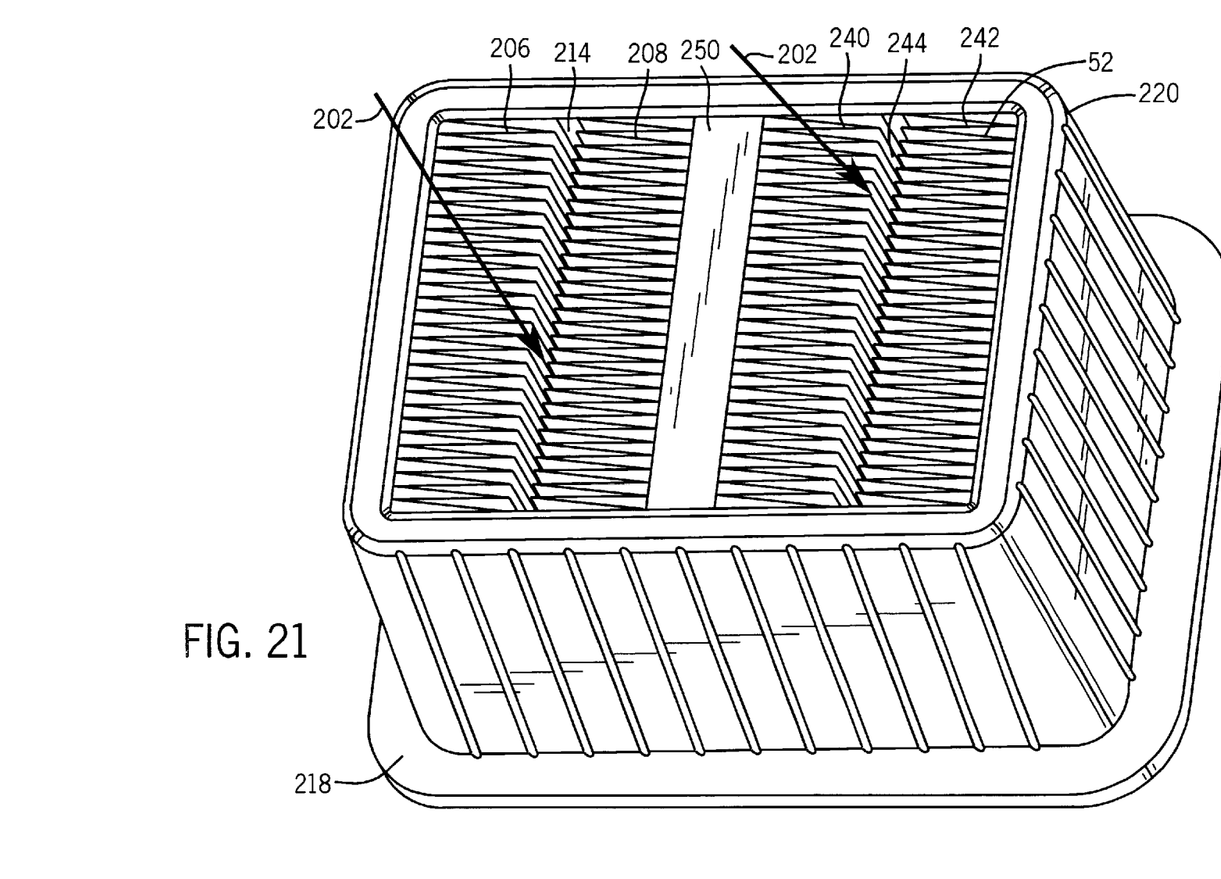
FIG. 21 is a perspective view showing the inlet end of an alternate embodiment of a filter constructed in accordance with the invention.
Figure 22:
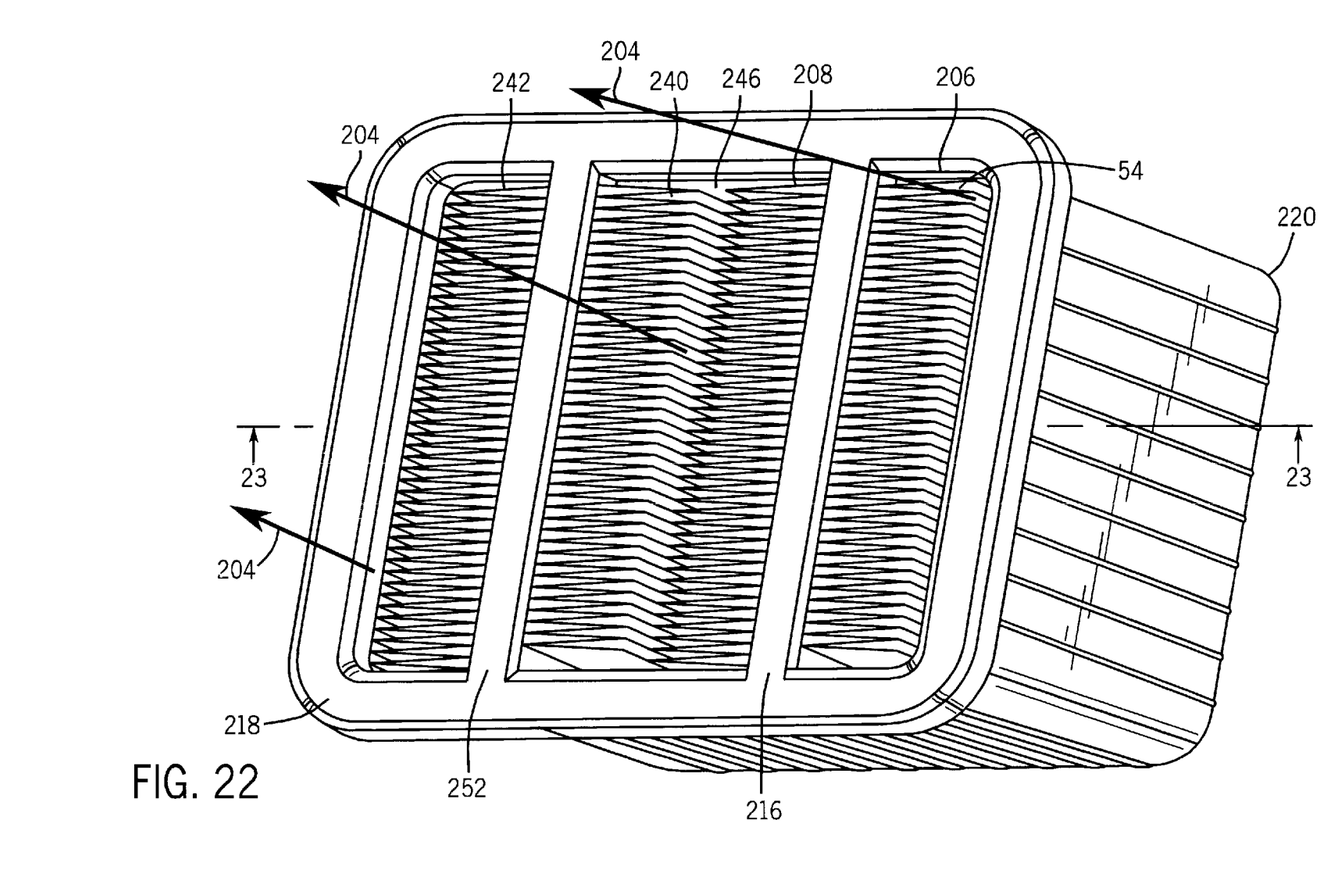
FIG. 22 is a perspective view showing the outlet end of the filter of FIG. 21.
Figure 23:
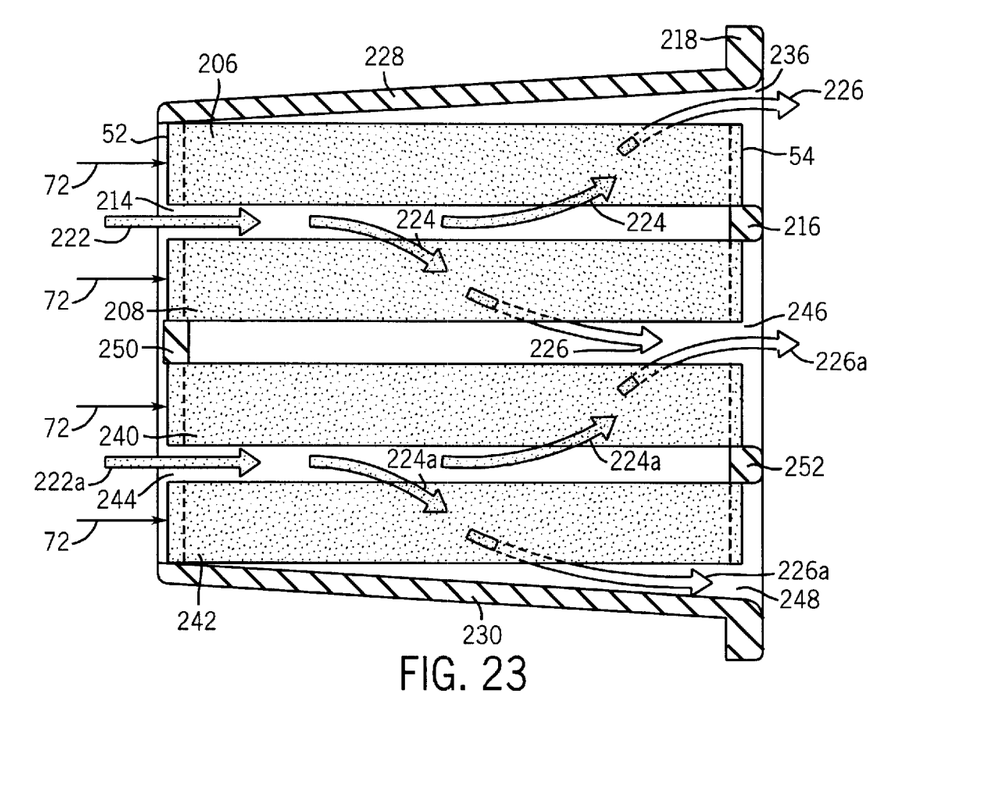
FIG. 23 is a sectional view taken along line 23—23 of FIG. 22.

FIGS. 21–23 show a further embodiment and a use like reference numerals from above where appropriate to facilitate understanding. First, second, third and fourth panels or rows 206, 208, 240, 242 of pleated filter elements 44 are provided. Two transverse gaps 214, 244 are provided between panels at upstream end 52, and one transverse gap 246 is provided between panels at downstream end 54. An additional downstream transverse gap 236, FIG. 23, is provided between housing sidewall 228 and panel 206, and another downstream transverse gap 248 is provided between panel 242 and housing sidewall 230. Transverse gap 214 is between panels 206 and 208. Transverse gap 244 is between panels 240 and 242. Transverse gap 246 is between panels 208 and 240. The transverse gap between panels 208 and 240 at upstream end 52 is closed and blocked at the upstream end by sealing strip 250 which may be part of the upstream end of the filter housing. The gap between panels 206 and 208 at downstream end 54 is blocked and closed by sealing strip 216, and the gap between panels 240 and 242 at downstream end 54 is blocked and closed by sealing strip 252, which sealing strips 216 and 252 may be part of cover flange 218 at the downstream end of the housing. Fluid flows axially through the filter as shown at arrows 72, 74, 76, FIG. 2. Fluid additionally flows through the filter,. FIG. 23, as shown at arrows 222, 224, 226, as noted above, and at arrows 222a, 224a, 226a. Additional inlet flow is enabled by transverse gaps 214, 244. Additional outlet flow is enabled by transverse gaps 236, 246, 248. In a further embodiment, the flow direction may be reversed such that incoming fluid flow enters the filter at end 54 through flow channels 70 and gaps 236, 246, 248, and exits the filter at end 52 through flow channels 58 and gaps 214, 244.

It is recognized that various equivalents, alternatives and modifications are possible within the scope of the appended claims.

What is claimed is:

1. A filter for filtering fluid flowing along an axial flow direction comprising a plurality of panels of pleated filter elements, each filter element having a plurality of pleats defined by wall segments extending along a transverse direction between first and second sets of pleat tips at first and second sets of axially extending bend lines, said transverse direction being perpendicular to said axial direction, each of said panels extending along a lateral direction perpendicular to said axial direction and perpendicular to said transverse direction, said wall segments extending axially between upstream and downstream ends, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter, through said open upstream ends of said first set of flow channels then through said wall segments then through said open downstream ends of said second set of flow channels, a first and a second of said panels having a transverse gap therebetween at one of said upstream and downstream ends and being sealed to each other at the other of said upstream and downstream ends, said gap providing additional fluid flow axially therethrough.

2. The invention according to claim 1 wherein said filter includes a housing having first and second transversely spaced sidewalls generally parallel to said panels, said first and second sidewalls being spaced transversely on distally opposite sides of said filter, at least one of said sidewalls and one of said panels having a second transverse gap therebetween at the other of said upstream and downstream ends and being sealed to each other at said one of said upstream and downstream ends, said second gap providing additional fluid flow axially therethrough.

3. The invention according to claim 2 wherein said first mentioned gap is at said upstream end, and said second mentioned gap is at said downstream end.

4. The invention according to claim 2 comprising a third transverse gap between the other of said sidewalls and the other of said panels, said third gap providing additional fluid flow axially therethrough.

5. The invention according to claim 4 wherein said third gap is at said other of said upstream and downstream ends.

6. The invention according to claim 5 wherein said second and third gaps are at said downstream end.

7. The invention according to claim 4 wherein said third transverse gap is. at said one of said upstream and downstream ends.

8. The invention according to claim 1 wherein said plurality of panels comprise first, second, third and fourth panels provided by first, second, third and fourth pleated filter elements, and comprising two transverse gaps between panels at said one of said upstream and downstream ends, and one transverse gap between panels at the other of said upstream and downstream ends, each of said gaps providing additional fluid flow axially therethrough.

9. The invention according to claim 8 comprising a first transverse gap between said first and second panels at said one of said upstream and downstream ends, a second transverse gap between said second and third panels at said other of said upstream and downstream ends, and a third said transverse gap between said third and fourth panels at said one of said upstream and downstream ends.

10. The invention according to claim 9 wherein said filter includeds a housing having first and second laterally extending sidewalls generally parallel to said panels, said first and second sidewalls being spaced transversely on distally opposite sides of said panels, at least one of said sidewalls and one of said first and fourth panels having a fourth transverse gap therebetween at said other of said upstream and downstream ends and being sealed to each other at said one of said upstream and downstream ends, said fourth gap providing additional fluid flow axially therethrough.

11. The invention according to claim 10 comprising a fifth transverse gap between the other of said sidewalls and the other of said first and fourth panels, said fifth gap providing additional fluid flow axially therethrough.

12. The invention according to claim 11 wherein said fifth gap is at said other of said upstream and downstream ends.

\* \* \* \* \*